Figure 1:
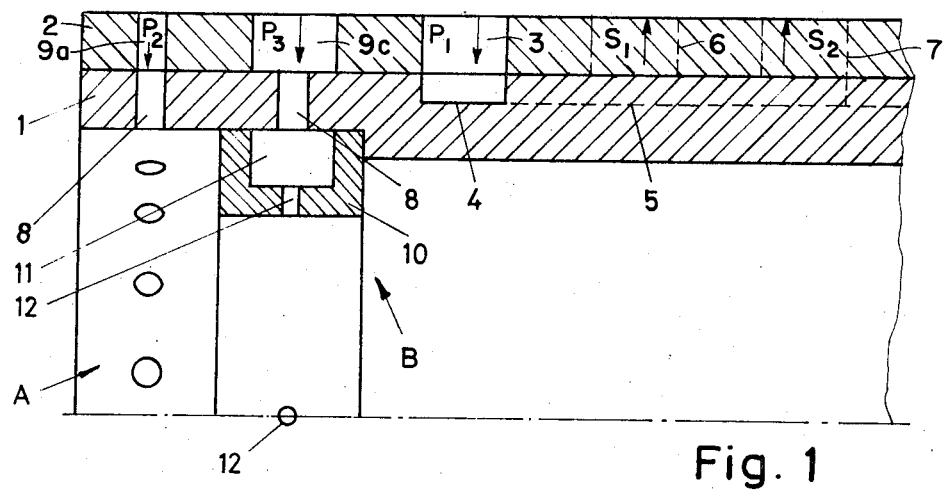

United States Patent [19]
Christensen

[11] 3,804,119
[45] Apr. 16, 1974

[54] CONTROL EQUIPMENT FOR HYDROSTATIC OR HYDRAULIC SYSTEMS (II)
[75] Inventor: Helge Kajholm Christensen, Nordborg, Denmark
[73] Assignee: Danfoss A/S, Nordorg, Denmark
[22] Filed: Nov. 6, 1972
[21] Appl. No.: 304,145

[30] Foreign Application Priority Data
Nov. 16, 1971  Germany............................ 2156840

[52] U.S. Cl............................. 137/625.32, 251/209
[51] Int. Cl.............................................. F16k 11/07
[58] Field of Search ...... 91/467; 137/625.3, 625.31, 137/625.32; 251/209, 345

[56]  References Cited
UNITED STATES PATENTS
| 304,443 | 9/1884 | Morrison | 137/625.32 |
| 944,026 | 12/1909 | Fowden | 137/625.3 X |
| 2,143,565 | 1/1939 | Minea | 137/625.32 X |
| 2,984,215 | 5/1961 | Charson | 91/467 |
| 3,421,544 | 1/1969 | Bozoyan | 137/625.31 X |

Primary Examiner—Henry T. Klinksiek

[57] ABSTRACT

The invention relates to a control valve assembly for a hydrostatic control system such as a power steering assembly. A common control valve assembly of this type has relatively rotatable inner and outer elements connected respectively to a vehicle steering wheel and a servomotor. Paired holes in the inner and outer elements permit the flow of fluid therethrough when the unit is in its neutral position with the paired holes in respective registration. In prior art units disturbing vibrations occur during the transition from the neutral position to a working position when the paired holes are moved out of registration. These vibrations are eliminated by making the holes in the outer element of varying size and larger than the corresponding holes in the inner element so that a gradual or progressive reduction of the porting area takes place instead of the paired holes closing simultaneously. Also, a chamber having a flow restricting orifice is incorporated downstream from the holes of the inner element. This provides a sound absorbing system by means of which disturbing noises can be greatly reduced.

7 Claims, 4 Drawing Figures

CONTROL EQUIPMENT FOR HYDROSTATIC OR HYDRAULIC SYSTEMS (II)

The invention relates to control equipment for hydrostatic or hydraulic systems and in which two slide elements are relatively displaceable from a neutral position into two working positions, one on each side of the neutral position, each element having a plurality of holes and each of the holes in the first element pairing and registering with a hole in the second element in the neutral position, the paired holes forming a bypass between the delivery and discharge sides, which equipment is especially designed for steering systems in which a first rotary slide element is connected to a steering wheel and a second rotary slide element to a servo motor which meters the pressurized fluid passed to a regulating element.

In a known piece of equipment of this kind, an inner rotary slide element is connected to the steering wheel and an outer rotary slide element is connected to a servo motor. The two rotary slide parts are normally held in the neutral position by a spring. When the steering wheel is turned in one or other direction, a bypass between the supply and discharge sides is closed, and an operative connexion is established, through other openings, with the regulating means, e.g. an axial motor which displaces the wheels.

By means of the compressed fluid flowing through the servo motor to or from the regulating element, the outer rotary slide element is caused to rotate in the direction in which the steering wheel is turned, until the neutral position is reached again. The outer rotary slide element is contained in a bore in a casing; these two parts act as a distributor valve for the servo motor designed as a rotary piston engine. Each of the rotary slide elements has 36 neutral position holes which are arranged in two axially offset circles each comprising 18 holes. The diameters of these holes are small and are identical in both of the rotary slide elements (U.S. Pat. specification Re No. 25,126).

It has been found that with control equipment of this kind disturbing noises occur particularly when the neutral position holes occupy a position in which the bypass is already considerably restricted. The object of the invention is to effect a considerable reduction of these noises.

According to the invention, this object is achieved by providing downstream of at least some of the paired holes, a chamber which is connected to the discharge side by way of at least one flow restricting orifice.

The downstream chamber and the flow restricting orifice constitute a sound absorbing system by means of which the disturbing noises can be greatly reduced. There is no difficulty is so selecting the size of the chamber and of the flow restricting orifice that the functioning of the bypass in the neutral position is not appreciably affected.

It is particularly advantageous if the paired holes are divided into at least two groups, and if at least some of the paired holes of the second group are still uncovered when all the paired holes of the first group are already closed, and if the chamber is disposed downstream of only the paired holes in the second group. In this arrangement, the flow restricting orifice may be relatively heavily throttled, since a sufficient number of paired holes are available in the neutral position for affording completely unrestricted passage to the bypass quantity. Conversely, the downstream chamber is fully effective in the case of those paired holes that are the last to remain uncovered during change over from the neutral to the working position.

It is also of advantage if at least some of the paired holes have differing cross-sections, those holes of smaller cross section being presented to the chamber. This step further reduces the noise.

In a preferred embodiment, in which the paired holes are arranged along two axially offset circles on two rotary slide elements, the chamber is constituted by at least one annular chamber at the free periphery of one of the rotary slide elements; this results in a particularly simple construction in which a chamber is common to all the paired holes of at least one circle.

In this arrangement, the paired holes of the first group may be arranged along the first circle and those of the second group along the second circle, and the annular space provided only in the zone of the second circle. Thus, differentiation between the two differing groups can be achieved in an extremely simple manner.

A very favourable construction comprises an annular insert in the interior of the inner rotary slide element, which insert incorporates an annular groove, which forms the annular chamber, is open towards the exterior and is covered by the inner circumference of this rotary slide element, as well as flow restricting bores. An insert of this kind can be conveniently fitted in a rotary slide at an initial or later stage.

Considerable advantage is achieved if the flow restricting orifice is bounded in part by a resilient element which increases the throttle cross section when the pressure increases. The resilient element is able to close the flow restricting orifice completely in the non operating position. The increase in the throttle cross section results in further improvement in adapting the system to the operating conditions.

A particularly simple arrangement of this kind is characterized in that the annular chamber is formed by a groove in the inner circumference of the inner rotary slide element; the open side is covered by a resilient ring.

Figure 2:
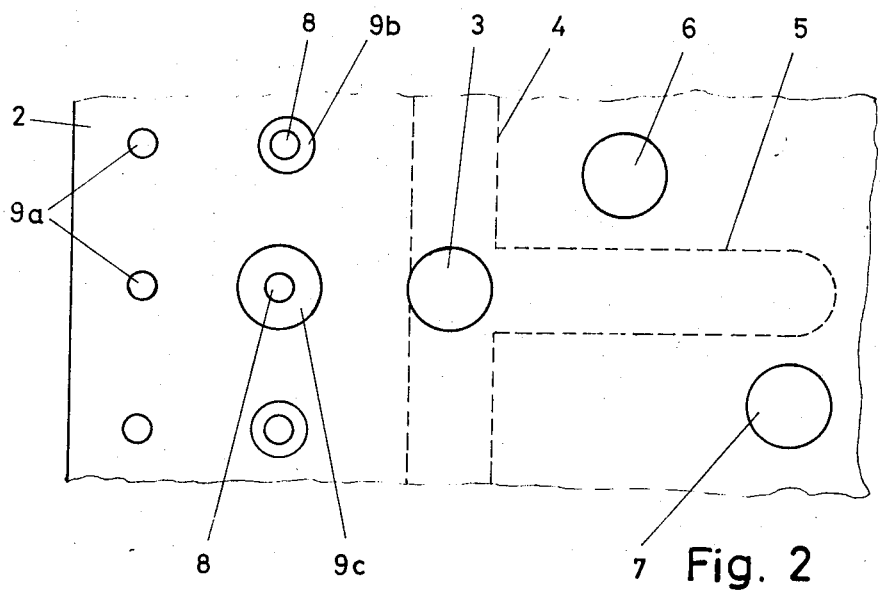
Figure 3:
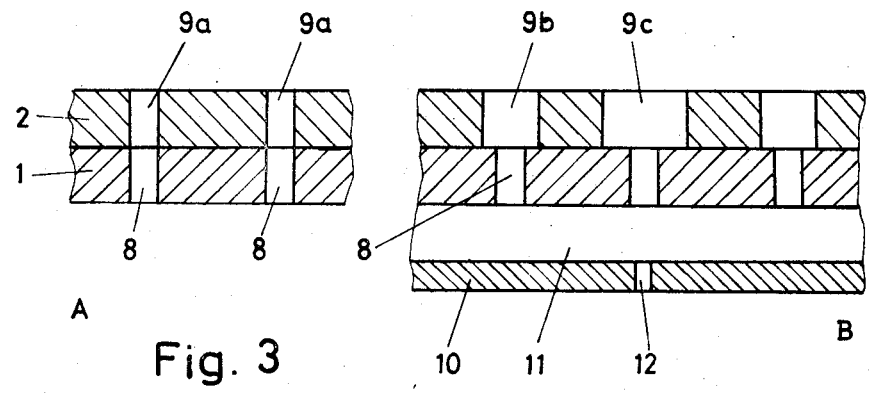
Figure 4:
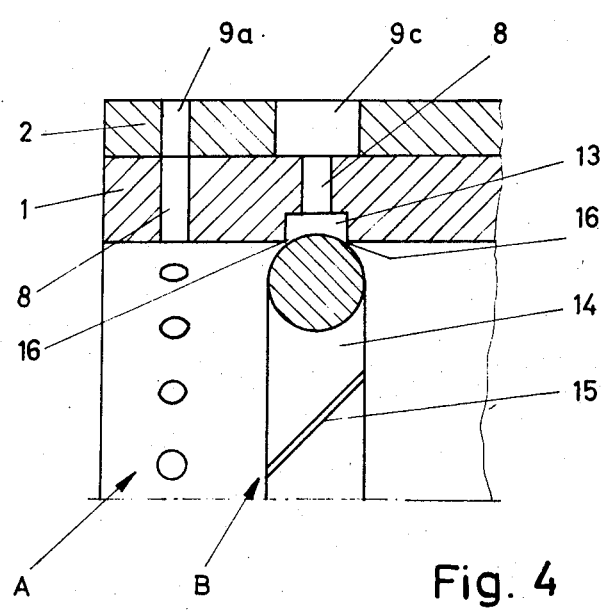

The invention will now be described in greater detail by reference to embodiments illustrated in the drawing, in which:

FIG. 1 is a longitudinal section through part of the rotary slide element of the control equipment of the invention, FIG. 2 is a plan view of the periphery of the outer rotary slide element of FIG. 1, FIG. 3 is a developed cross section through the rotary slide elements in the neutral position, and FIG. 4 shows, in an illustration similar to that of FIG. 1, another embodiment of the invention.

The control equipment comprises an inner rotary slide element 1 and an outer rotary slide element 2. The inner rotary slide element 1 may be connected to a steering wheel and the outer element 2 to a servo motor as described in U.S. Pat. specification Re No. 25,126. The outer rotary slide element 2 can, however, be stationary and the inner rotary slide element 1 may be rotated by some other means.

Provided in the outer rotary slide element 2 are bores 3 through which the pressurized fluid is passed in the direction of the arrow $P_1$. The bores 3 communicate with a peripheral groove 4 in the inner rotary slide element 1, and axial grooves 5 extend from said peripheral groove. Rotation to the left enables an axial groove 5 to be connected to a bore 6 which passes the pressurized fluid in the direction of the arrow $S_1$ to a regulating element (not illustrated), which is displaced in one of its directions of movement. Rotation to the right brings the axial groove 5 into communication with a bore 7 through which the pressurized fluid is passed to the regulating member in the direction of the arrow $S_2$ so that this member is displaced in its other direction of movement. Expediently, similar grooves and bores are provided in the two slide elements for the purpose of controlling the return flow of the pressurized fluid.

The rotary slide elements have neutral position holes 8 and 9, which register with each other and are located on two circles A and B in axially offset juxtaposed relationship to each other. Three different sizes of hole are provided. The holes 8 in the inner rotary slide element 1 all have the same diameter or cross section. The holes $9a$ in the first circle A have the same diameter or cross section as the holes 8. The holes $9b$ in the second circle B have a greater diameter or cross section, and the holes $9c$ in the second circle B have the greatest diameter or cross section. An annular insert 10 is provided in the interior of the inner rotary slide 1 in the zone of the second circle B. The insert contains an annular groove 11 which constitutes a downstream chamber and is connected through flow restricting orifices 12 to the cavity in the rotary slide arrangement.

If it is assumed that pressurized fluid is received at the outer ends of the holes 9 and that the cavity in the rotary slide arrangement is connected to the discharge side, then in the neutral position pressurized fluid flows in the direction of the arrows $P_2$ and $P_3$ through the paired holes 8, $9a$ in the first group of circle A and the paired holes 8, $9b$ and 8, $9c$ of the second group or circle B, and in the case of the last named paired holes the fluid must then also flow through the chamber 11 and the flow restricting orifices 12.

When the rotary slides 1 and 2 are rotated relatively to each other from the neutral position, the uncovered cross section of the paired holes 8, $9a$ of the first group A first diminishes. When these paired holes are closed, the paired holes 8, $9b$ and 8, $9c$ are still uncovered. Upon further rotation, the uncovered cross section of these paired holes is also reduced so that a progressively increasing throttling effect occurs. Despite this, no disturbing noises are caused, since the throttling action of the paired holes together with the downstream chamber 11 and the flow restricting orifices 12 damp down the noise. This effect is reinforced by the holes $9b$ and $9c$ being greater than the downstream holes 8.

FIG. 3 shows the circle A on the left and the circle B on the right. It can be clearly seen from this figure that when relative displacement takes place only the uncovered cross section of the paired holes 8, $9a$ is initially reduced until completely closed, that beyond a certain rotary angle the uncovered cross section of the paired holes 8, $9b$ begins to diminish and that the uncovered cross section of the paired holes 8, $9c$ only diminishes when the paired holes of group A are already closed. If for example 18 holes $9a$, 12 holes $9b$ and 6 holes $9c$ are used and if the circumferential extent of the holes $9c$ is considerably greater than that of the holes $9a$, a bypass amount — rotary angle curve is obtained, in which the bypass amount decreases with increase in the rotary angle, rapidly at first, then gradually, and finally very slowly. In an arrangement of this kind, the fact that the axial groove 5 is already in communication with the bore 6 or the bore 7 when the bypass is still not completely cut off is not important or may even be desirable, since small quantities of pressurized fluid can still flow through the bypass.

FIG. 4 illustrates a modified arrangement in which the same reference symbols as before are used for designating like parts. In this arrangement an annular groove 13, which is covered by a split resilient ring 14, is formed in the inner circumference of the inner rotary slide 1. The split 15 permits the ring to move away from the edges of the annular groove 13 as pressure rises, so that flow restricting orifices 16 are created in the form of annular gaps. Instead of a chamber being provided downstream of all the holes in a group, each hole of the group may have its own downstream chamber with a flow restricting opening or a resilient element. The invention can be applied not only to cylindrical rotary slides but also to flat and linear slides.

The drawing illustrates the preferred arrangement in which the axial groove 5 overlaps the bores 6 and 7, although the paired neutral-position holes 8, 9 are still not fully closed.

I claim:

1. A control valve assembly for hydrostatic control systems comprising relatively rotatable inner and outer bushing shaped valve elements having slidably engaging cylindrical surfaces, said inner element beind displaceable in either circumferential direction from a neutral position to a working position, said elements having first and second sets of bypass holes respectively with said first set registering with said second set when said inner element is in its neutral position, a chamber formed internally of said inner element and having fluid communication with at least a group of said first set of bypass holes of said inner element, said chamber having flow restricting orifice means downstream from said group of holes.

2. A control valve assembly according to claim 1 wherein registering pairs of said holes are divided into two groups A and B, at least some of the paired holes of group B still being open when all the paired holes in group A are fully closed when said inner element is moved towards said working position, said chamber only having fluid communication with holes of group B.

3. A control valve assembly according to claim 1 wherein at least some of said holes of said second set are larger respectively than corresponding paired holes of said first set.

4. A control valve assembly according to claim 1 wherein said chamber has an annular shape with an outer circumferentially extending wall formed by an inner wall of said inner element.

5. A control valve assembly according to claim 2 wherein said groups A and B are axially spaced from each other and said chamber connects only with holes of group B.

6. A control valve assembly according to claim 4 wherein said chamber is formed by an annularly shaped insert having an outwardly open groove, and holes in said insert forming flow restricting orifice means.

7. A control valve assembly according to claim 4 wherein said chamber is formed by a resilient annularly shaped insert having a circular cross section, said resilient insert having a gap forming said flow restricting orifice means, said gap being of variable width in dependence upon the pressure of gaseous fluid present in said chamber.

* * * * *